(12) United States Patent
Ono et al.

(10) Patent No.: US 12,139,026 B2
(45) Date of Patent: Nov. 12, 2024

(54) WORK VEHICLE

(71) Applicant: Kubota Corporation, Osaka (JP)

(72) Inventors: Kohei Ono, Sakai (JP); Nozomu Akiyama, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/372,360

(22) Filed: Sep. 25, 2023

(65) Prior Publication Data

US 2024/0100971 A1 Mar. 28, 2024

(30) Foreign Application Priority Data

Sep. 26, 2022 (JP) ................................. 2022-152769

(51) Int. Cl.
| | | |
|---|---|---|
| *B60L 50/60* | (2019.01) | |
| *B60K 1/04* | (2019.01) | |
| *B60K 17/28* | (2006.01) | |
| *B60R 21/13* | (2006.01) | |
| *B62D 49/06* | (2006.01) | |

(52) U.S. Cl.
CPC ............... *B60L 50/66* (2019.02); *B60K 1/04* (2013.01); *B60K 17/28* (2013.01); *B60K 2001/0416* (2013.01); *B60K 2001/0438* (2013.01); *B60L 2200/40* (2013.01); *B60R 21/131* (2013.01); *B62D 49/0671* (2013.01)

(58) Field of Classification Search
CPC ....... B60L 50/66; B60L 2200/40; B60K 1/04; B60K 17/28; B60K 2001/0438; B62D 49/0671; B60Y 2200/22; B60Y 2200/221; B60Y 2400/61
See application file for complete search history.

(56) References Cited

U.S. PATENT DOCUMENTS

| | | | | |
|---|---|---|---|---|
| 7,915,753 | B2* | 3/2011 | Endo ..................... | B60L 3/0084 307/10.1 |
| 8,366,524 | B2* | 2/2013 | Ichikawa ............ | B60H 1/00021 454/69 |
| 8,616,310 | B2* | 12/2013 | Lopez ..................... | B60L 8/003 180/53.3 |
| 8,668,037 | B2* | 3/2014 | Shinde ................... | B62K 5/025 180/68.5 |
| 9,045,028 | B2* | 6/2015 | Ichikawa ................. | B60L 1/08 |
| 9,272,636 | B2* | 3/2016 | Ichikawa ............... | B60K 17/10 |
| 10,442,425 | B2* | 10/2019 | Miyashita ............ | B60K 17/356 |
| 10,717,361 | B2* | 7/2020 | Nishinaka ............. | H02J 7/0013 |
| 2021/0053435 | A1* | 2/2021 | Ito .......................... | B60K 6/485 |
| 2022/0379704 | A1* | 12/2022 | Tottori .................... | B60K 1/04 |
| 2022/0379970 | A1* | 12/2022 | Nakayama .............. | B60L 50/64 |
| 2023/0391408 | A1* | 12/2023 | Hirase ................ | H05K 7/20927 |

(Continued)

FOREIGN PATENT DOCUMENTS

| | | |
|---|---|---|
| EP | 39883666 A1 | 4/2022 |
| JP | 2013141875 A | 7/2013 |
| WO | 2021131249 A1 | 7/2021 |

*Primary Examiner* — Drew J Brown
*Assistant Examiner* — Tiffany L Webb
(74) *Attorney, Agent, or Firm* — The Webb Law Firm (57) ABSTRACT

A work vehicle includes travel devices, a battery, a motor configured to supply motive power to the travel devices, an inverter configured to operate the motor, and an operation section. The battery is between a front travel device and a rear travel device in a side view, and below a floor of the operation section.

5 Claims, 8 Drawing Sheets

(56) References Cited

U.S. PATENT DOCUMENTS

2024/0100931 A1* 3/2024 Ono ................. B60K 17/06
2024/0100967 A1* 3/2024 Ono ................. B60K 17/28
2024/0132168 A1* 4/2024 Nakagawa ......... B62D 49/0678

* cited by examiner

WORK VEHICLE

CROSS-REFERENCE TO RELATED APPLICATION

This application claims priority to Japanese Patent Application No. 2022-152769 filed Sep. 26, 2022, the disclosure of which is hereby incorporated by reference in its entirety.

BACKGROUND OF THE INVENTION

Field of the Invention

The present invention relates to an electric work vehicle in which a motor drives a travel device, and a hybrid work vehicle in which an engine and a motor drive a travel device.

Description of Related Art

JP 2013-141875A discloses an example of an electric work vehicle. JP 2013-141875A states that a transmission case that houses a transmission for travel is provided at a rear portion of the work vehicle, and a motor is connected to a front portion of the transmission case. A battery is provided at a portion slightly higher than front wheels (each of which corresponds to travel devices) in a front portion of the work vehicle.

JP 2013-141875A discloses an example of related art.

In JP 2013-141875A, the battery, which is a heavy object, is located at the front portion of the work vehicle, thus making the front-back balance of the work vehicle favorable while the work vehicle is performing work travel with a work device supported by the rear portion of the work vehicle. However, there are also cases where the work vehicle performs work travel with the work device supported by the front portion of the work vehicle.

SUMMARY OF THE INVENTION

The present invention aims to configure a work vehicle such that providing a battery, which is a heavy object, at an appropriate position improves the front-back balance of the work vehicle with the work device supported by the work vehicle.

A work vehicle of the present invention includes: travel devices including a front travel device and a rear travel device; at least one battery; a motor configured to supply motive power to the travel devices; an inverter configured to operate the motor; and an operation section having a floor, wherein the at least one battery is between the front travel device and the rear travel device in a side view and below the floor of the operation section.

According to the present invention, the battery is located near the center of the work vehicle in the front-back direction. Thus, if the work device is relatively small in weight, the front-back balance of the work vehicle is unlikely to be upset even if the work device is supported by the front portion of the work vehicle or by the rear portion of the work vehicle. This allows for a work vehicle suitable for work travel with a work device having a relatively small weight supported by the front or rear portion of the work vehicle.

According to the present invention, the battery is located below the floor of the operation section, and is located at a low position. Thus, the center of gravity of the work vehicle can be lowered, thereby improving the traveling stability of the work vehicle.

In the present invention, it is preferable that the work vehicle further includes a left body frame and a right body frame that extend in a front-back direction below the floor, wherein the at least one battery is between the left body frame and the right body frame in a plan view.

There are cases where left and right body frames of a work vehicle extend in the front-back direction below the floor of the operation section.

According to the present invention, the battery is between the left and right body frames and protected by the left and right body frames. This is advantageous in terms of preventing damage to the battery since it is possible to reduce the number of small stones or the like that are bounced off during work travel and hit the battery.

In the present invention, it is preferable that the at least one battery includes a first battery and a second battery, the first battery is between the front travel device and the rear travel device in a side view and below the floor, and the second battery is supported at a position forward of the first battery and above the first battery.

If a battery with a large vertical dimension is disposed below the floor of the operation section, the bottom of the battery will be closer to the ground, which is not preferable. It is preferable to dispose the battery with a small vertical dimension below the floor of the operation section. However, with a battery with a small vertical dimension, there is a possibility that the overall capacity of the battery in the work vehicle will become insufficient.

According to the present invention, the first battery is between the front and rear travel devices below the floor of the operation section, and the second battery is at a different position, so that the overall capacity of the battery in the work vehicle is unlikely to become insufficient.

According to the present invention, the second battery is supported at a position forward of the first battery and above the first battery. The region forward of the first battery and above the first battery is a section of the work vehicle that has a relatively large space.

The provision of the first battery eliminates the need to configure the second battery to be larger than necessary, and the second battery is provided in a section having a relatively large space. This allows for greater flexibility in the location of the second battery and allows the second battery to be provided without difficulty.

A work vehicle of the present invention includes: a travel device; a battery; a motor; an inverter configured to operate the motor; an operation section including an operator seat; and a transmission case housing a transmission for travel, wherein the motor, the transmission, and the travel device are configured such that motive power from the motor is transmitted to the transmission and transmitted from the transmission to the travel device, the transmission case is below the operator seat, and the battery is between the operator seat and the transmission case in a side view.

According to the present invention, the battery is located relatively far rearward from the center of the work vehicle in the front-back direction. Thus, the battery can easily function as a balance weight while a work device having a relatively large weight is supported by the front portion of the work vehicle. This allows for a work vehicle suitable for work travel with a work device having a relatively large weight supported by the front portion of the work vehicle.

In the work vehicle, if the transmission case is below the operator seat in the operation section, a relatively large space is likely to be created between the operator seat and the transmission case.

According to the present invention, the space between the operator seat and the transmission case can be effectively used to install the battery relatively easily, and the support structure for the battery can be configured relatively easily, thus simplifying the support structure for the battery.

According to the present invention, work on the battery can be easily performed by, for example, removing the operator seat, thus improving the maintainability of the battery.

A work vehicle of the present invention includes: a travel device; at least one battery; a motor configured to supply motive power to the travel device; an inverter configured to operate the motor; an operation section; and a ROPS frame, wherein the at least one battery is on the ROPS frame.

There are cases where a work vehicle has a ROPS frame, which is configured to have sufficient strength.

According to the present invention, the battery is on the ROPS frame, and thus the work vehicle can be provided with the battery with sufficient strength.

In the present invention, it is preferable that the work vehicle further includes: an operator seat included in the operation section; and a transmission case housing a transmission for travel, wherein the at least one battery includes a first battery and a second battery, the transmission case is below the operator seat in the operation section, the motor, the transmission, and the travel device are configured such that motive power from the motor is transmitted to the transmission and transmitted from the transmission to the travel device, the first battery is on the ROPS frame, and the second battery is between the operator seat and the transmission case in a side view.

The ROPS frame of a work vehicle is often exposed upward, and there are cases where it is difficult to provide a large battery on the ROPS frame. However, if a relatively small battery is provided on the ROPS frame, there is a possibility that the overall capacity of the battery in the work vehicle will become insufficient.

According to the present invention, the first battery is on the ROPS frame, and the second battery is at a different position, so that the overall capacity of the battery in the work vehicle is unlikely to become insufficient.

In the work vehicle, if the transmission case is below the operator seat in the operation section, a relatively large space is likely to be created between the operator seat and the transmission case.

According to the present invention, the second battery is between the operator seat and the transmission case. With this, the space between the operator seat and the transmission case can be effectively used to provide the second battery relatively easily, and the support structure for the second battery can be configured relatively easily. Thus, simplification of the support structure for the second battery can be achieved.

According to the present invention, work on the second battery can be easily performed by, for example, removing the operator seat, thus improving the maintainability of the second battery.

In the present invention, it is preferable that the work vehicle further includes: an operator seat included in the operation section; a transmission case housing a transmission for travel; a work device; a link mechanism disposed on the transmission case, configured to be raised and lowered, and joined to the work device; a hydraulic cylinder disposed on the transmission case and configured to raise and lower the link mechanism; a hydraulic pump configured to supply hydraulic oil to the hydraulic cylinder; and a pump motor configured to drive the hydraulic pump, wherein the motor, the transmission, and the travel devices are configured such that motive power from the motor is transmitted to the transmission and transmitted from the transmission to the travel devices, the transmission case is below the operator seat, and the pump motor is between the operator seat and the transmission case in a side view.

In a work vehicle, there are cases where a link mechanism is disposed on the transmission case such that the link mechanism can be raised and lowered, and a hydraulic cylinder for raising and lowering the link mechanism and a hydraulic pump for supplying hydraulic oil to the hydraulic cylinder are disposed on the transmission case. With this, the work device can be joined to the link mechanism and raised and lowered by raising and lowering the link mechanism with use of the hydraulic cylinder.

The hydraulic cylinder and the hydraulic pump are provided in the transmission case in order to supply lubricating oil stored in the transmission case as hydraulic oil to the hydraulic pump, then supply the hydraulic oil from the hydraulic pump to the hydraulic cylinder, and return the hydraulic oil from the hydraulic cylinder to the transmission case.

In the work vehicle, if the transmission case is below the operator seat in the operation section, a relatively large space is likely to be created between the operator seat and the transmission case.

According to the present invention, in the case of providing the pump motor for driving the hydraulic pump, the pump motor can be provided relatively easily by effectively using the space between the operator seat and the transmission case. Further, the support structure for the pump motor can be configured relatively easily, and simplification of the support structure for the pump motor can be achieved.

According to the present invention, the pump motor is between the operator seat and the transmission case, and thus the pump motor is near the hydraulic pump. This can simplify the structure for driving the hydraulic pump with use of the pump motor.

According to the present invention, work on the pump motor can be easily performed by, for example, removing the operator seat, thus improving the maintainability of the pump motor.

DESCRIPTION OF THE INVENTION

FIGS. 1 to 8 show electric tractors, each of which is an example of a work vehicle. In FIGS. 1 to 8, F indicates the forward direction, B indicates the rearward direction, U indicates the upward direction, D indicates the downward direction, R indicates the rightward direction, and L indicates the leftward direction.

Overall Configuration of Tractor

Figure 1:
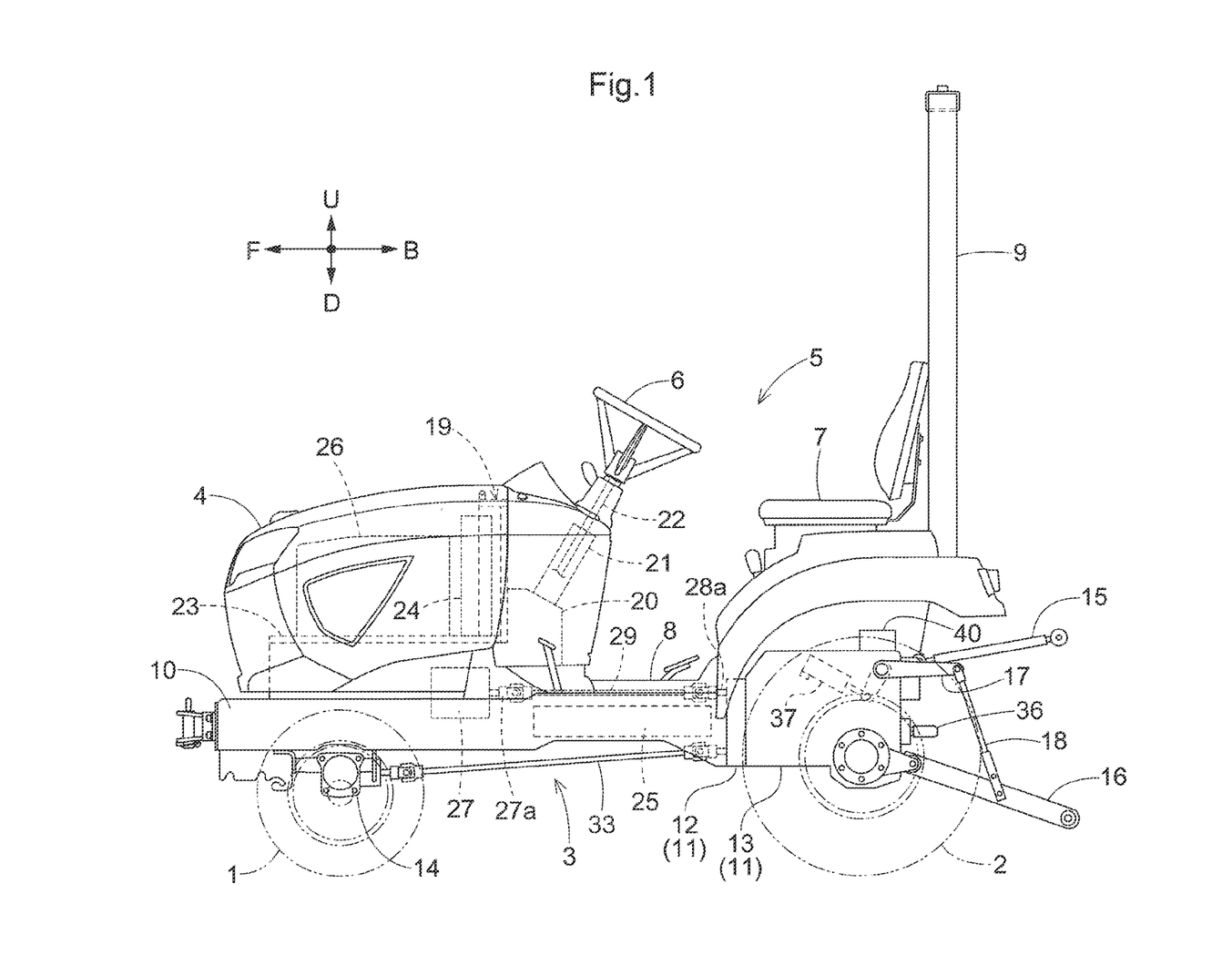
FIG. 1 is a left side view of a tractor.

As shown in FIG. 1, left and right front wheels 1 (each of which corresponds to a front travel device) and left and right rear wheels 2 (each of which corresponds to a rear travel device) support a body 3 of the tractor. A hood 4 is provided at a front portion of the body 3, and an operation section 5 is provided at a rear portion of the body 3. The operation section 5 includes a steering wheel 6 for steering the front wheels 1, an operator seat 7, a floor 8, and a ROPS frame 9.

The body 3 has left and right body frames 10, a transmission case 11, and so on. The transmission case 11 has a front case 12 and a rear case 13 that are joined to each other. The left and right body frames 10 are connected to the transmission case 11 and extend in the front-back direction below the operation section 5 (floor 8). The transmission case 11 is located below the operator seat 7 in the operation section 5.

A front axle case 14 is supported by front portions of the body frames 10, and supports the left and right front wheels 1. The transmission case 11 (rear case 13) supports the left and right rear wheels 2.

A top link 15 (which corresponds to a link mechanism) and left and right lower links 16 (each of which corresponds to a link mechanism) are provided at a rear portion of the transmission case 11 (rear case 13) in such a manner as to be swingable in the up-down direction. The top link 15 and the lower links 16 can be joined to a work device (not shown), such as a rotary cultivator.

Left and right lift arms 17 are provided at the rear portion of the transmission case 11 (rear case 13), and a connecting rod 18 is connected to the lift arms 17 and the lower links 16. The top link 15 and the lower links 16 are raised and lowered and the work device is raised and lowered by swinging the lift arms 17 in the up-down direction.

Configuration of Front Portion of Body

Figure 2:
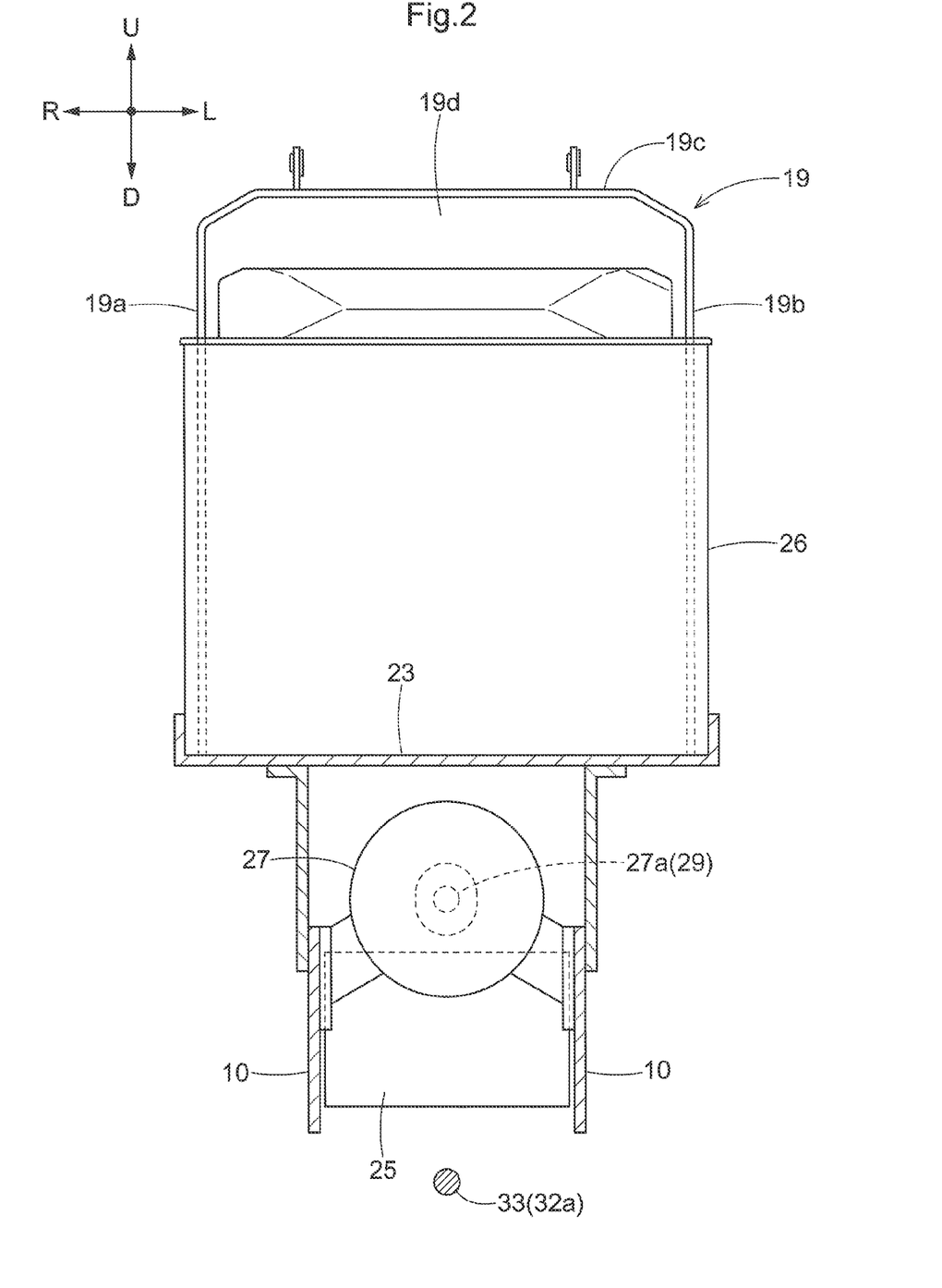
FIG. 2 is a longitudinal front view of a region around a second battery and a motor.

As shown in FIGS. 1 and 2, a pillar frame 19 is provided on the body frames 10 between the front wheels 1 and the operation section 5 (rear wheels 2). The pillar frame 19 is constituted by a folded plate material and has a right section 19a, a left section 19b, an upper section 19c, and a rear section 19d.

The rear section 19d of the pillar frame 19 is flat and extends in the up-down direction and the left-right direction. The right section 19a of the pillar frame 19 is formed by bending forward a right portion of the rear section 19d of the pillar frame 19, and extends in the up-down direction and the front-back direction. The left section 19b of the pillar frame 19 is formed by bending forward a left portion of the rear section 19d of the pillar frame 19, and extends in the up-down direction and the front-back direction.

The upper section 19c of the pillar frame 19 is formed by bending forward an upper portion of the rear section 19d of the pillar frame 19, and extends in the left-right direction and the front-back direction. The upper section 19c of the pillar frame 19 extends between upper portions of the right section 19a and the left section 19b of the pillar frame 19.

As shown in FIG. 1, the hood 4 is supported such that the hood 4 is openable and closable about a fulcrum in the left-right direction of the upper section 19c of the pillar frame 19, and can be operated from a closed position shown in FIG. 1 to an open position above the closed position.

A power steering mechanism 20 is provided below a rear face portion of the rear section 19d of the pillar frame 19. A steering post 21 is attached to the power steering mechanism 20 and extends upward from the power steering mechanism 20. A steering wheel 6 is supported by an upper portion of the steering post 21, and a steering shaft 22 is connected to the steering wheel 6 and the power steering mechanism 20.

In response to the steering wheel 6 being rotated, the rotation of the steering wheel 6 is transmitted to the power steering mechanism 20 via the steering shaft 22, and the power steering mechanism 20 steers the front wheels 1 to the left and right.

Configuration Related to Inverter

A support platform 23 is attached to front upper portions of the left and right body frames 10, as shown in FIGS. 1 and 2. An inverter 24, which is provided on the support platform 23, has a rectangular case with a small dimension (dimension in the front-back direction) that houses various types of equipment.

The inverter 24 extends in the up-down direction in a side view and extends in the left-right direction in a plan view (front view), and is attached to a rear portion of the support platform 23 so as to be in contact with a front face portion of the rear section 19d of the pillar frame 19.

The inverter 24 is provided between the right section 19a and the left section 19b of the pillar frame 19 in a front view and overlaps the right section 19a and the left section 19b of the pillar frame 19 in a side view. The inverter 24 is provided below the upper section 19c of the pillar frame 19 in a front view and overlaps the upper section 19c of the pillar frame 19 in a plan view.

Configuration Related to Battery

The tractor has a first battery 25 and a second battery 26, as shown in FIGS. 1 and 2. Each of the batteries 25 and 26 is constituted by multiple pairs of stacks (not shown) of connected battery modules (not shown) that are housed in a rectangular-parallelepiped case.

The first battery 25 is disposed between and attached to the left and right body frames 10. A front portion of the first battery 25 is located below the pillar frame 119 and below the power steering mechanism 20, and a rear portion of the first battery 25 is close to the transmission case 11 (front case 12).

The support platform 23 is attached to the front portions of the left and right body frames 10 and located at a position higher than the body frames 10. The second battery 26 is attached to the support platform 23. The second battery 26 is provided forward of the inverter 24 and above the body frames 10 and the front axle case 14.

The hood 4 at the closed position covers the inverter 24 and the second battery 26. Maintenance work on the inverter 24 and the second battery 26 can be performed by opening the hood 4.

With the above configuration, the battery 25 (first battery 25) is provided between the front wheels 1 (front travel devices) and the rear wheels 2 (rear travel devices) and below the floor 8 of the operation section 5 in a side view, as shown in FIGS. 1 and 2.

The left body frame 10 and the right body frame 10 extends in the front-back direction below the floor 8 of the operation section 5, and the battery 25 (first battery 25) is provided between the left body frame 10 and the right body frame 10 in a plan view (front view).

The second battery 26 is supported at a position forward of the first battery 25 and above the first battery 25.

Configuration Related to Motor

Left and right mounting brackets 42 are joined to inner faces of the left and right body frames 10, and left and right portions of a motor 27 are joined to the left and right mounting brackets 42, as shown in FIGS. 1 and 2.

The motor 27 is provided between the front wheels 1 and the rear wheels 2 and below the support platform 23, the second battery 26, and the inverter 24 in a side view. The inverter 24 and the second battery 26 are provided above the motor 27 in aside view.

The inverter 24 converts DC power from the batteries 25 and 26 to AC power and supplies the AC power to the motor 27 to operate the motor 27. Motive power from the motor 27 is supplied to the front wheels 1 and the rear wheels 2, as shown in FIG. 3.

Configuration of System for Transmission to Front Wheels and Rear Wheels

Figure 3:
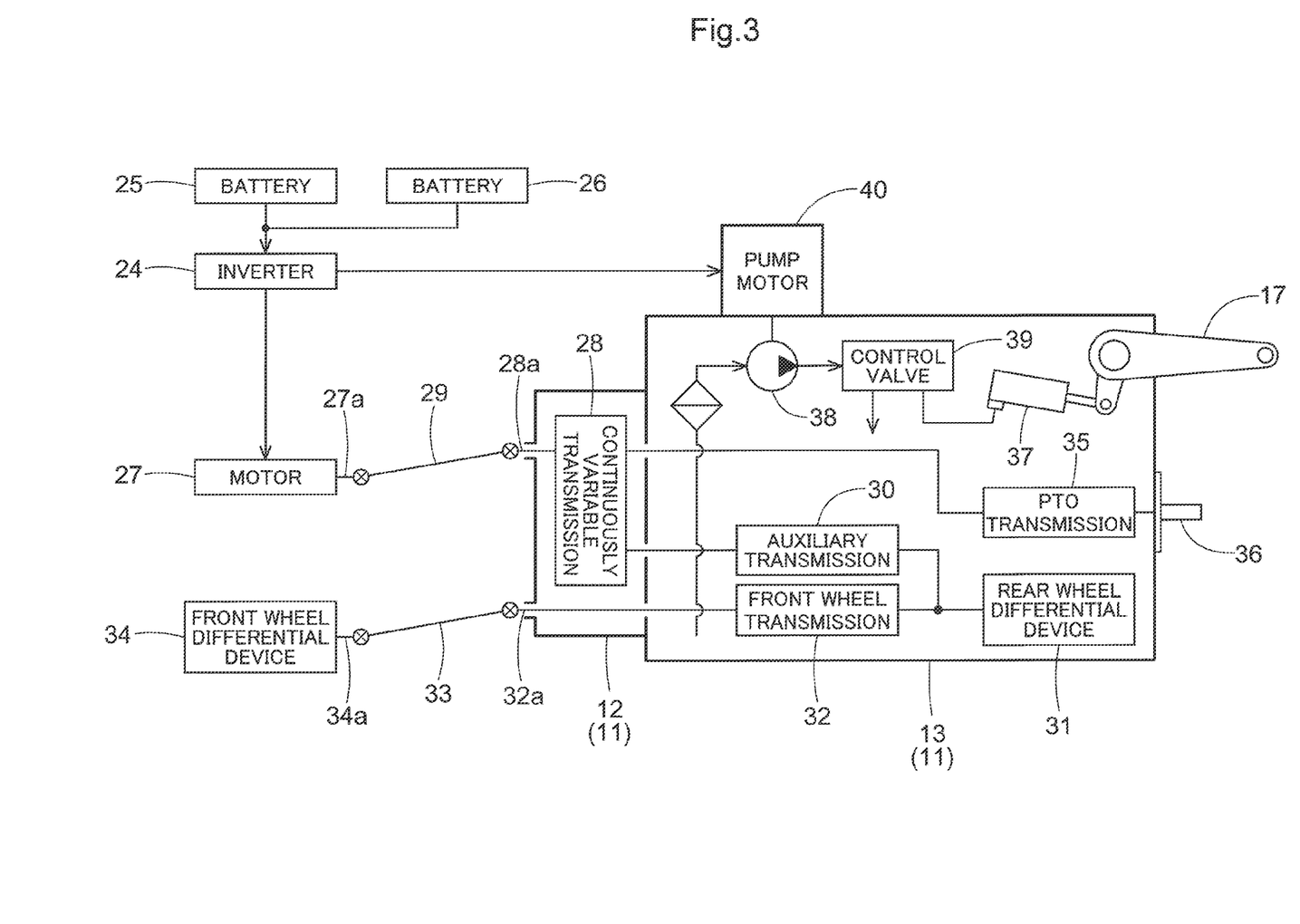
FIG. 3 schematically shows a system for transmission from the motor to front and rear wheels.

A hydrostatic continuously variable transmission 28 (which corresponds to a transmission for travel) is housed within the front case 12 of the transmission case 11, as shown in FIGS. 1, 2, and 3. A transmission shaft 29 is connected to an output shaft 27a of the motor 27 and an input shaft 28a of the continuously variable transmission 28, and motive power from the motor 27 is transmitted to the continuously variable transmission 28 via the transmission shaft 29. The continuously variable transmission 28 is capable of steplessly changing forward and backward and is operated by a gearshift pedal (not shown) on the floor 8 of the operation section 5.

An auxiliary transmission 30 (which corresponds to a transmission for travel), a rear wheel differential device 31, and a front wheel transmission 32 (which corresponds to a transmission for travel) are housed within the rear case 13 of the transmission case 11. Motive power subjected to speed change by the continuously variable transmission 28 is transmitted to the auxiliary transmission 30, and is then transmitted from the auxiliary transmission 30 to the rear wheels 2 via the rear wheel differential device 31.

Motive power diverted from between the auxiliary transmission 30 and the rear wheel differential device 31 is transmitted to the front wheel transmission 32. The output shaft 32a of the front wheel transmission 32 passes through the interior of the front case 12 of the transmission case 11 and extends forward from a lower portion of the front case 12 of the transmission case 11.

The front wheel differential device 34 is provided within the front axle case 14, and an input shaft 34a of the front wheel differential device 34 extends rearward from the front axle case 14. A transmission shaft 33 is connected to the output shaft 32a of the front wheel transmission 32 and the input shaft 34a of the front wheel differential device 34. Motive power from the front wheel transmission 32 is transmitted to the front wheel differential device 34 via the transmission shaft 33, and is then transmitted from the front wheel differential device 34 to the front wheels 1.

The front wheel transmission 32 drives the front wheels 1 and the rear wheels 2 at the same speed while the front wheels 1 are operated within the range of left and right set angles from a straight-ahead position. The front wheel transmission 32 drives the front wheels 1 at a higher speed than the rear wheels 2 while the front wheels 1 are steered leftward or rightward beyond the left and right setting angles.

With the above configuration, the tractor has the transmission case 11 (front case 12 and rear case 13) that houses the continuously variable transmission 28 (transmission for travel), the auxiliary transmission 30 (transmission for travel), and the front wheel transmission 32 (transmission for travel), as shown in FIG. 3.

Motive power from the motor 27 is transmitted via the transmission shaft 29 to the continuously variable transmission 28 (transmission for travel), the auxiliary transmission 30 (transmission for travel), and the front wheel transmission 32 (transmission for travel), and is then transmitted from the continuously variable transmission 28 (transmission for travel), the auxiliary transmission 30 (transmission for travel), and the front wheel transmission 32 (transmission for travel) to the front wheels 1 (travel devices) and the rear wheels 2 (travel devices).

The first battery 25 is provided below the output shaft 27a of the motor 27, the input shaft 28a of the continuously variable transmission 28, and the transmission shaft 29. The first battery 25 is provided above the output shaft 32a of the front wheel transmission 32, the input shaft 34a of the front wheel differential device 34, and the transmission shaft 33.

The transmission shaft 29 extends in the front-back direction above the first battery 25 and below the floor 8, and the transmission shaft 33 extends in the front-back direction below the first battery 25. The first battery 25 is provided between the transmission shaft 29 and the transmission shaft 33 in a side view.

Configuration of System for Transmission to Work Device Joined to Top Link and Lower Links A PTO transmission 35 is housed within the rear case 13 of the transmission case 11, and a PTO shaft 36 is provided at a rear portion of the rear case 13 of the transmission case 11, as shown in FIGS. 1 and 3. A transmission shaft (not shown) is connected to the PTO shaft 36 and the work device in response to the work device being joined to the top link 15 and the lower links 16.

While motive power from the motor 27 is transmitted to the continuously variable transmission 28 via the transmission shaft 29, motive power from the transmission shaft 29 (motive power that is not subjected to speed change by the continuously variable transmission 28) is transmitted to the PTO transmission 35, and motive power subjected to speed change by the PTO transmission 35 is transmitted to the PTO shaft 36 and then transmitted from the PTO shaft 36 to the work device.

Configuration Related to Lifting Operation of Lift Arm

A single-acting hydraulic cylinder 37 is provided above the rear portion of the transmission case 11 (rear case 13), and the hydraulic cylinder 37 raises and lowers the lift arm 17, as shown in FIG. 3.

A hydraulic pump 38 and a control valve 39 are provided within the rear portion of the transmission case 11 (rear case 13). Lubricating oil that serves as hydraulic oil and stored in the transmission case 11 (rear case 13) is supplied to the hydraulic pump 38, and is then supplied from the hydraulic pump 38 to the control valve 39.

A pump motor 40 is provided above the rear portion of the transmission case 11 (rear case 13) and drives the hydraulic pump 38. The inverter 24 converts DC power from the batteries 25 and 26 to AC power and supplies the AC power to the pump motor 40 to operate the pump motor 40.

Operations to supply and discharge the hydraulic oil to and from the hydraulic cylinder 37 are performed from the control valve 39, and the hydraulic cylinder 37 raises and lowers the lift arm 17. The hydraulic oil discharged from the hydraulic cylinder 37 is returned from control valve 39 to the transmission case 11 (rear case 13).

With the above configuration, the hydraulic cylinder 37, which raises and lowers the top link 15 (link mechanism) and the lower links 16 (link mechanism) to which the work device is joined, and the hydraulic pump 38, which supplies the hydraulic oil to the hydraulic cylinder 37, are provided in the transmission case 11 (rear case 13), as shown in FIGS. 1 and 3.

The pump motor 40, which drives the hydraulic pump 38, is located between the operator seat 7 in the operation section 5 and the transmission case 11 (rear case 13) in a side view.

First Variation of Implementation of the Invention

In the configuration shown in FIGS. 1 and 2, the motor 27 may be joined to the support platform 23 and supported by the body 3. The motor 27 may be joined to the pillar frame 19 and supported by the body 3.

In the configuration shown in FIGS. 1 and 2, the inverter 24 may be joined to the pillar frame 19 and supported by the body 3. The inverter 24 may be provided forward of the second battery 26 in a side view.

Second Variation of Implementation of the Invention

Figure 4:
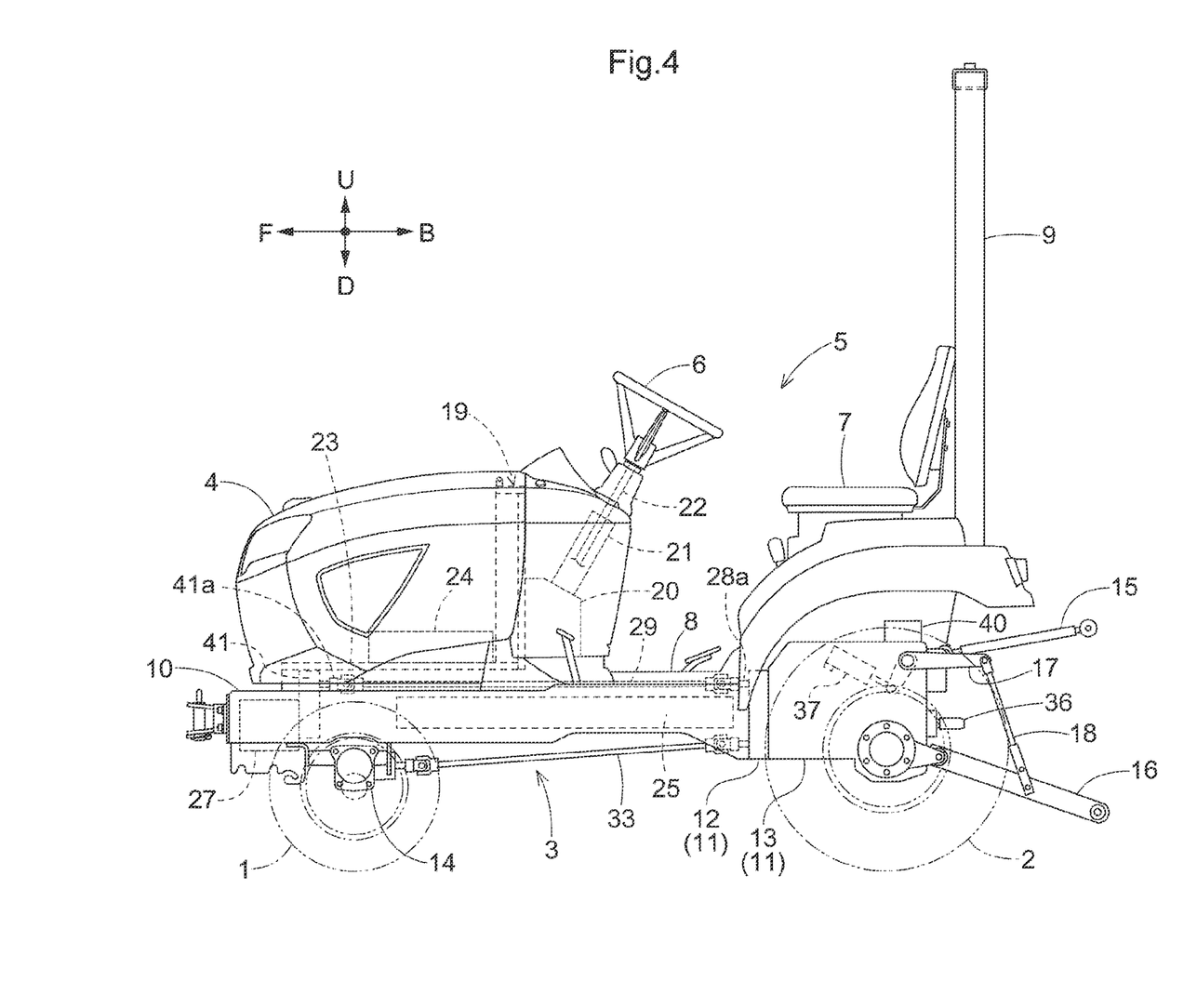
FIG. 4 is a left side view of a tractor according to a second variation of implementation of the present invention.

If the battery 25 is disposed between and attached to the left and right body frames 10, the battery 25 may have a larger capacity and be provided such that the front portion of the battery 25 is located above the front axle case 14 and the rear portion of the battery 25 is located close to the transmission case 11 (front case 12), as shown in FIG. 4.

The second battery 26 (see FIG. 1) may be eliminated, as shown in FIG. 4. The motor 27 need only be provided forward of the front axle case 14 (front wheels 1 (front travel devices)) in a side view since the front portion of the battery 25 is located above the front axle case 14.

According to the configuration shown in FIG. 4, the motor 27 is disposed at a lower position. Thus, a transmission mechanism 41 of a gear transmission type need only be attached to the output shaft 27a of the motor 27 and extend upward from the motor 27. The transmission shaft 29 need only be connected to an output shaft 41a at an upper portion of the transmission mechanism 41 and the input shaft 28a of the continuously variable transmission 28 (see FIG. 3) and extend in the front-back direction above the front axle case 14 and the battery 25 and below the floor 8.

Motive power from the output shaft 27a of the motor 27 is transmitted to the transmission mechanism 41, then from the output shaft 41a of transmission mechanism 41 to the continuously variable transmission 28 (see FIG. 3) via the transmission shaft 29, and is transmitted to the front wheels 1 and the rear wheels 2.

According to the configuration shown in FIG. 4, the motor 27 is disposed at a lower position. Thus, the support platform 23 may be configured to be lower and the inverter 24 may be attached to the support platform 23 along the horizontal direction.

If the inverter 24 is attached to the support platform 23 in the horizontal direction, the hood 4 need only be configured such that the front portion of the hood 4 is lower, and the upper portion of the hood 4 need only extend diagonally forward and downward from the upper section 19c of the pillar frame 19 in a side view. This provides a wide forward and downward view for an operator sitting in the operator seat 7 in the operation section 5.

In the configuration shown in FIG. 4, the motor 27 may be joined to the support platform 23 and supported by the body 3. The inverter 24 may be joined to the pillar frame 19 in the up-down direction and supported by the body 3, as shown in FIG. 1.

Third Variation of Implementation of the Invention

Figure 5:
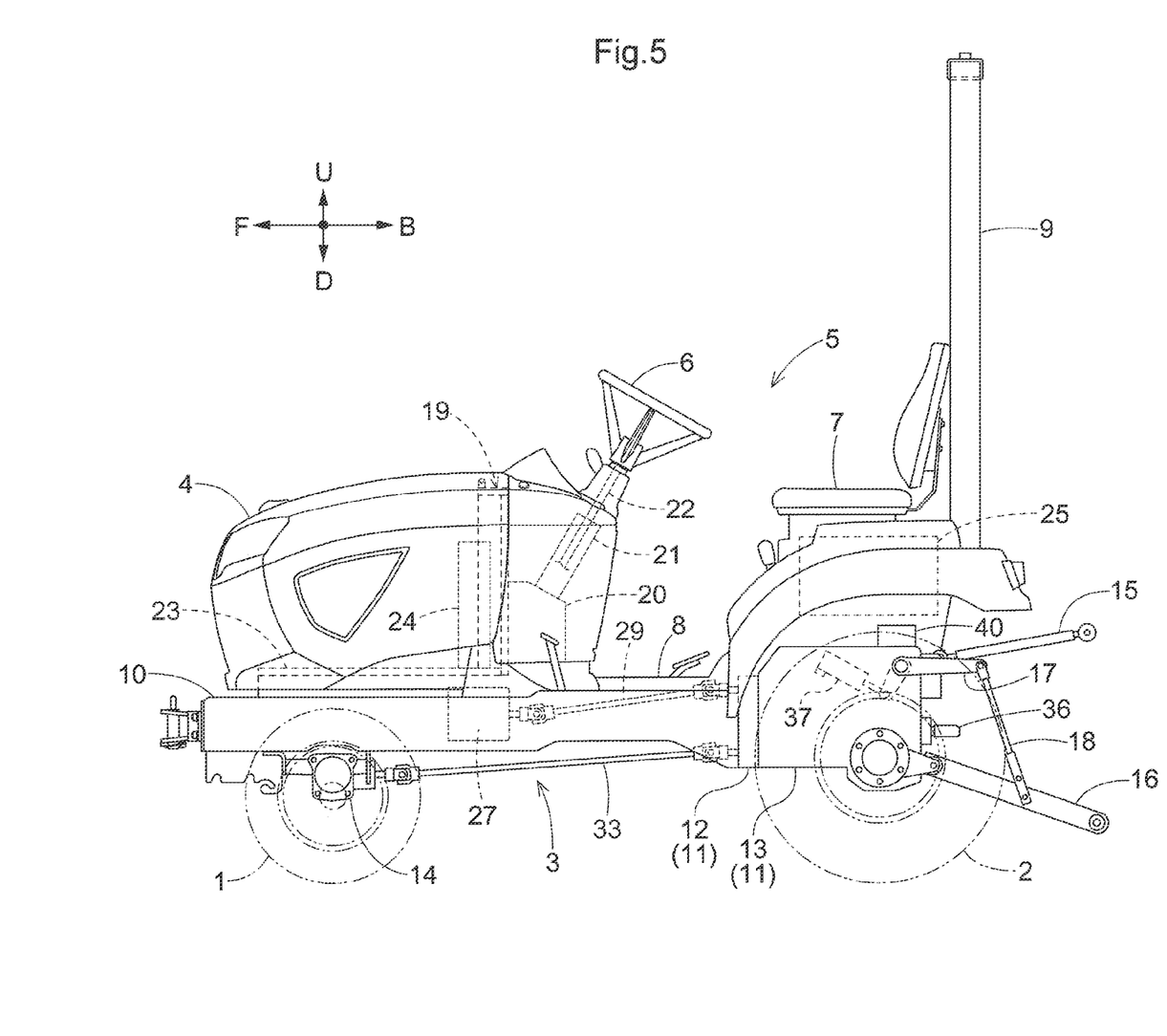
FIG. 5 is a left side view of a tractor according to a third variation of implementation of the present invention.

If the transmission case 11 (front case 12 and rear case 13) is provided below the operator seat 7 in the operation section 5, the battery 25 may be attached to an upper portion of the transmission case 11 (front case 12 and rear case 13) and provided between the operator seat 7 in the operation section 5 and the transmission case 11 (front case 12 and rear case 13) in a side view, as shown in FIG. 5.

In the configuration shown in FIG. 5, if the pump motor 40 (see FIG. 1) is attached to a left or right side portion of the transmission case 11 (rear case 13), the battery 25 can be attached to the upper portion of the transmission case 11 (front case 12 and rear case 13) without difficulty.

The second battery 26 (see FIG. 1) may be eliminated. If the battery 25 alone has insufficient capacity, the second battery 26 may also be attached to the support platform 23 as shown in FIG. 1.

If the second battery 26 is eliminated, the hood 4 need only be configured such that the front portion of the hood 4 is lower, and the upper portion of the hood 4 need only extend diagonally forward and downward from the upper section 19c of the pillar frame 19 in a side view. This provides a wide forward and downward view for an operator sitting in the operator seat 7 in the operation section 5.

According to the configuration shown in FIG. 5, the battery 25 is not provided between the left and right body frames 10. Thus, the motor 27 can be disposed at a position lower than the position shown in FIG. 1. This allows the support platform 23 to be configured to be lower and the position of the inverter 24 to be lower than the position shown in FIG. 1.

In the configuration shown in FIG. 5, the inverter 24 may be attached to the support platform 23 in the horizontal direction, as shown in FIG. 4.

Fourth Variation of Implementation of the Invention

Figure 6:
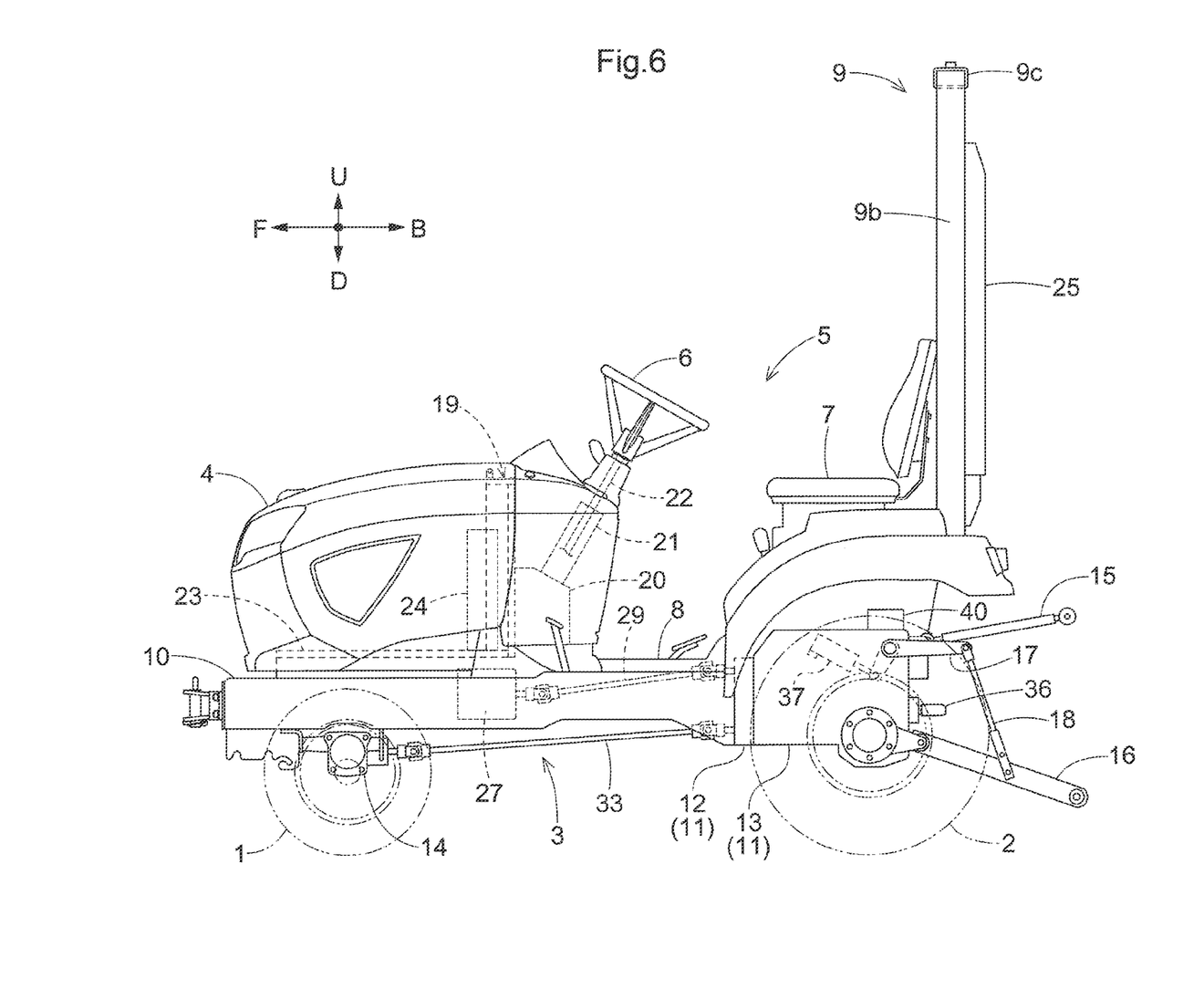
FIG. 6 is a left side view of a tractor according to a fourth variation of implementation of the present invention.
Figure 7:
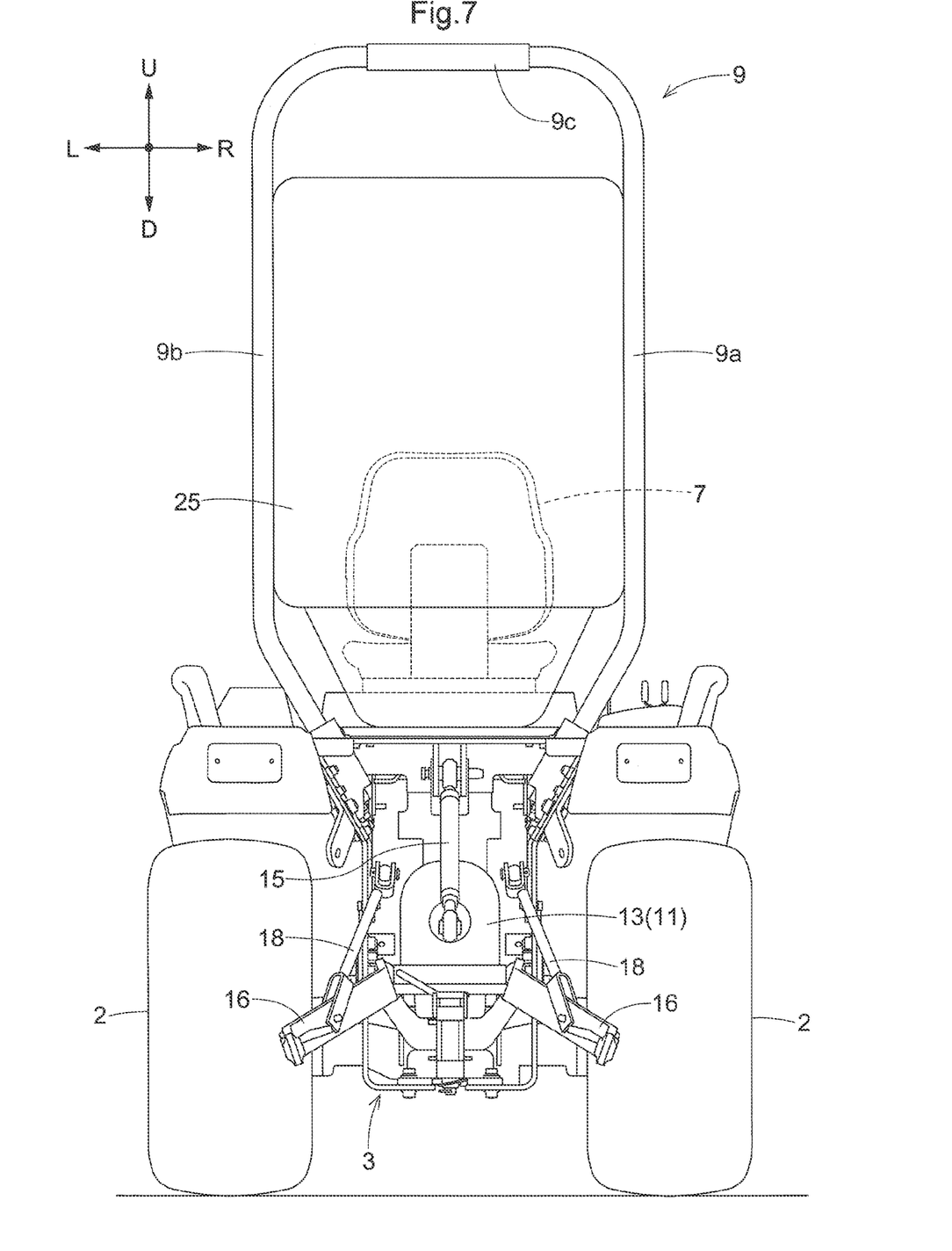
FIG. 7 is a back view of the tractor according to the fourth variation of implementation of the present invention.

The battery 25 may be provided on the ROPS frame 9 located rearward of the operator seat 7, as shown in FIGS. 6 and 7.

The ROPS frame 9 is constituted by a bent square pipe, and has a right section 9a, a left section 9b, and an upper section 9c.

The right section 9a of the ROPS frame 9 extends in the up-down direction, and a lower portion of the right section 9a of the ROPS frame 9 is joined to the transmission case 11 (rear case 13). The left section 9b of the ROPS frame 9 extends in the up-down direction, and a lower portion of the left section 9b of the ROPS frame 9 is joined to the transmission case 11 (rear case 13). The upper section 9c of the ROPS frame 9 extends in the left-right direction and is joined to an upper portion of the right section 9a and an upper portion of the left section 9b of the ROPS frame 9.

The battery 25 is configured to be small in the dimension in the front-back direction, disposed between the right section 9a and the left section 9b of the ROPS frame 9 in a back view (front view), and joined to the right section 9a and the left section 9b of the ROPS frame 9.

The battery 25 extends in the up-down direction and the left-right direction behind the operator seat 7 in the operation section 5. The battery 25 overlaps the right section 9a and the left section 9b of the ROPS frame 9 in a side view, and overlaps the upper section 9c of the ROPS frame 9 in a plan view.

The second battery 26 (see FIG. 1) may be eliminated, as shown in FIGS. 6 and 7. A headrest (not shown) may also be attached to a portion of the front face of the battery 25 above of the operator seat 7.

Fifth Variation of Implementation of the Invention

Figure 8:
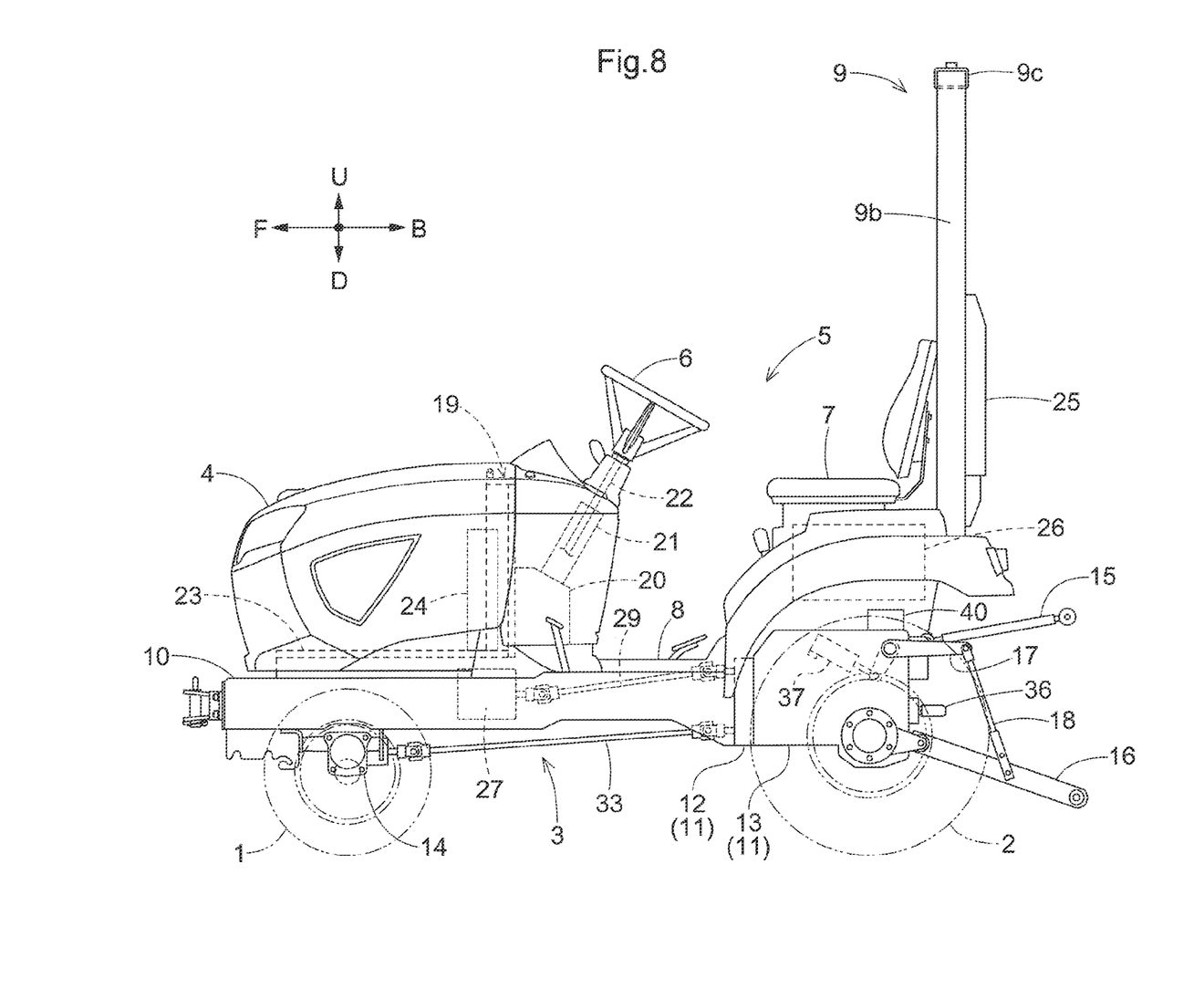
FIG. 8 is a left side view of a tractor according to a fifth variation of implementation of the present invention.

If the first battery 25 is provided on the ROPS frame 9, the second battery 26 may be attached to the upper portion of the transmission case 11 (front case 12 and rear case 13) and provided between the operator seat 7 in the operation section 5 and the transmission case 11 (front case 12 and rear case 13) in a side view, as shown in FIG. 8.

The first battery 25 is disposed between the right section 9a and the left section 9b of the ROPS frame 9 in a back view (front view) and connected to the right section 9a and the left section 9b of the ROPS frame 9, as in the configuration shown in FIGS. 6 and 7. The first battery 25 extends in the up-down direction and the left-right direction behind the operator seat 7 in the operation section 5. The first battery 25 overlaps the right section 9a and the left section 9b of the ROPS frame 9 in a side view, and overlaps the upper section 9c of the ROPS frame 9 in a plan view.

If the first and second batteries 25 and 26 are provided, the first battery 25 can be configured to be shorter than the battery 25 shown in FIGS. 6 and 7, as shown in FIG. 8.

In the configuration shown in FIG. 8, a headrest (not shown) may also be attached to an upper portion of the first battery 25. The inverter 24 may be attached to the support platform 23 in the horizontal direction, as shown in FIG. 4.

If the pump motor 40 (see FIG. 1) in the configuration shown in FIG. 8 is attached to a left or right side portion of the transmission case 11 (rear case 13), the second battery 26 can be attached to the upper portion of the transmission case 11 (front case 12 and rear case 13) without difficulty.

Sixth Variation of Implementation of the Invention

If the tractor has the first and second batteries 25 and 26, and the first battery 25 is provided on the ROPS frame 9, the second battery 26 may be provided between the left and right body frames 10, as shown in FIG. 1. The second battery 26 may be attached to the support platform 23, as shown in FIG. 1. The second battery 26 may be provided both between the left and right body frames 10 and at the support platform 23.

Seventh Variation of Implementation of the Invention

If the second battery 26 is provided forward of the operation section 5 as shown in FIG. 1, the inverter 24 may be provided forward of the second battery 26.

According to this configuration, the inverter 24 extends in the up-down direction in a side view and extends in the left-right direction in a plan view (front view), and is provided between a front portion of the hood 4 and a front portion of the second battery 26.

Eighth Variation of Implementation of the Invention

In the configuration shown in any of FIGS. 1, 4, 5, 6, and 8, the motor 27 may be provided above the front axle case 14 (front wheels 1 (front travel devices)) in a side view. The motor 27 in this configuration may be joined to the support platform 23 and supported by the body 3.

In the configuration shown in any of FIGS. 1, 5, 6 and 8, the motor 27 may be provided forward of the front axle case 14 (front wheels 1 (front travel devices)) in a side view, as shown in FIG. 4.

Ninth Variation of Implementation of the Invention

In the configuration shown in any of FIGS. 1, 4, 5, 6, and 8, the motor 27 may be attached to the upper portion of the transmission case 11 (front case 12 and rear case 13), and may be provided between the operator seat 7 in the operation section 5 and the transmission case 11 (front case 12 and rear case 13) in a side view.

Tenth Variation of Implementation of the Invention

In the configuration shown in any of FIGS. 1, 4, 5, 6, and 8, the inverter 24 may be provided between the operator seat 7 in the operation section 5 and the transmission case 11 (front case 12 and rear case 13) in a side view by attaching the inverter 24 to a support frame (not shown) that is provided in the operation section 5 to support the operator seat 7.

Eleventh Variation of Implementation of the Invention

In the case of the ROPS frame 9 that is constituted by a square pipe material, the first battery 25 may be provided inward of the square pipe of the ROPS frame 9.

According to this configuration, the first battery 25 is not exposed to the outside of the ROPS frame 9, thus allowing for good rearward visibility for the operator sitting in the operator seat 7. The second battery 26 need only be provided between the operator seat 7 in the operation section 5 and the transmission case 11 (front case 12 and rear case 13) to ensure the overall capacity of the batteries 25 and 26.

The ROPS frame 9 may be provided in an area corresponding to the pillar frame 19 in a side view, rather than being provided rearward of the operator seat 7, and the ROPS frame 9 may be provided forward of the steering wheel 6.

Twelfth Variation of Implementation of the Invention

The tractor may have a four-wheel steering structure in which the front wheels 1 and the rear wheels 2 are steered in the same and opposite phases by the steering wheel 6.

Crawler-type travel devices (not shown) may be provided instead of the front wheels 1 as the front travel devices. Crawler-type travel devices (not shown) may be provided instead of the rear wheels 2 as the rear travel devices. One crawler-type travel device (not shown) may be provided instead of the front wheels 1 and the rear wheels 2.

The first and second batteries 25 and 26 may be attached to the support platform 23 and located inside the hood 4.

INDUSTRIAL APPLICABILITY

The present invention can be applied to not only electric tractors in which a motor drives a travel device, but also to hybrid tractors in which an engine and a motor drive a travel device, and can be applied to not only tractors but also construction work vehicles and agricultural work vehicles.

What is claimed is:

1. A work vehicle comprising:
   a travel device;
   at least one battery;
   a motor configured to supply motive power to the travel device;
   an inverter configured to operate the motor;
   an operation section; and
   a ROPS frame, and
   wherein:
   the ROPS frame comprises a right section and a left section extending in the up-down direction behind an operator seat, the at least one first battery is on the ROPS frame and extends between the right section and the left section in the up-down direction.

2. The work vehicle according to claim 1, further comprising:
   at least one second battery;
   wherein the at least one second battery is between the front travel device and the rear travel device in a side view and below the operator seat of the operation section.

3. The work vehicle according to claim 2, further comprising:
   a left body frame and a right body frame that extend in a front-back direction below the floor, and
   wherein the at least one second battery is between the left body frame and the right body frame in a plan view.

4. The work vehicle according to claim 1, further comprising:
   a second battery, and
   wherein:
   the transmission case is below the operator seat,
   the motor, the transmission, and the travel device are configured such that motive power from the motor is transmitted to the transmission and transmitted from the transmission to the travel device, and the second battery is between the operator seat and the transmission case in a side view.

5. The work vehicle according to claim 1, further comprising:

an operator seat included in the operation section;

a transmission case housing a transmission for travel;

a work device;

a link mechanism disposed on the transmission case, configured to be raised and lowered, and joined to the work device;

a hydraulic cylinder disposed on the transmission case and configured to raise and lower the link mechanism;

a hydraulic pump configured to supply hydraulic oil to the hydraulic cylinder; and a pump motor configured to drive the hydraulic pump, and wherein:

the motor, the transmission, and the travel devices are configured such that motive power from the motor is transmitted to the transmission and transmitted from the transmission to the travel devices, the transmission case is below the operator seat, and the pump motor is between the operator seat and the transmission case in a side view.

* * * * *

UNITED STATES PATENT AND TRADEMARK OFFICE
CERTIFICATE OF CORRECTION

| | |
|---|---|
| PATENT NO. | : 12,139,026 B2 |
| APPLICATION NO. | : 18/372360 |
| DATED | : November 12, 2024 |
| INVENTOR(S) | : Kohei Ono et al. |

Page 1 of 1

It is certified that error appears in the above-identified patent and that said Letters Patent is hereby corrected as shown below:

In the Claims

Column 12, Line 50, Claim 2, after "battery;" insert -- and --

Signed and Sealed this
Eighteenth Day of February, 2025

Coke Morgan Stewart
*Acting Director of the United States Patent and Trademark Office*